(12) United States Patent
Stawitzky et al.

(10) Patent No.: US 9,322,678 B1
(45) Date of Patent: Apr. 26, 2016

(54) ANTENNA COVERING FOR WIRELESS SENSOR

(71) Applicant: Electrochem Solutions, Inc., Clarence, NY (US)

(72) Inventors: James K. Stawitzky, North Tonawanda, NY (US); Jorge Marin, West Bridgewater, MA (US); George Cintra, Holliston, MA (US)

(73) Assignee: Electrochem Solutions, Inc., Clarence, NY (US)

(*) Notice: Subject to any disclaimer, the term of this patent is extended or adjusted under 35 U.S.C. 154(b) by 251 days.

(21) Appl. No.: 13/914,249

(22) Filed: Jun. 10, 2013

Related U.S. Application Data (60) Provisional application No. 61/657,409, filed on Jun. 8, 2012.

(51) Int. Cl.
  *G01D 11/24* (2006.01)
  *G01L 9/00* (2006.01)
(52) U.S. Cl.
  CPC ............... *G01D 11/245* (2013.01); *G01L 9/00* (2013.01)
(58) Field of Classification Search
  USPC .......................................................... 73/431
  See application file for complete search history.

(56) References Cited

U.S. PATENT DOCUMENTS

| 5,909,194 | A | 6/1999 | Umeda et al. |
| 6,855,115 | B2 * | 2/2005 | Fonseca et al. ............... 600/488 |
| 7,389,695 | B2 * | 6/2008 | Skwara ........................... 73/708 |
| 7,514,930 | B2 | 4/2009 | Chen et al. |
| 7,525,505 | B2 | 4/2009 | Cislo |
| 7,832,277 | B2 | 11/2010 | Skwara |
| 7,986,144 | B2 | 7/2011 | He et al. |
| 2005/0218898 | A1 * | 10/2005 | Fredette et al. ............... 324/342 |
| 2007/0135803 | A1 * | 6/2007 | Belson .............................. 606/1 |
| 2007/0157734 | A1 * | 7/2007 | Skwara ........................... 73/708 |
| 2008/0216556 | A1 * | 9/2008 | Skwara .......................... 73/1.57 |
| 2009/0204132 | A1 * | 8/2009 | Ortiz et al. .................... 606/157 |
| 2009/0314542 | A1 | 12/2009 | Arocha-Ferrino et al. |
| 2010/0114149 | A1 * | 5/2010 | Albrecht et al. .............. 606/192 |
| 2011/0316542 | A1 * | 12/2011 | Frey et al. ..................... 324/339 |

* cited by examiner

*Primary Examiner* — Lisa Caputo
*Assistant Examiner* — Jamel Williams
(74) *Attorney, Agent, or Firm* — Steven W. Winn (57) ABSTRACT

A wireless pressure sensor comprising a protective covering positionable over the sensor's antenna portion is described. The protective covering comprises a body having an annular sidewall that extends from a proximal end to a distal end and is composed of a fluoroelastomer material. A cavity resides within the body extending through the proximal end to a distal end sidewall positioned perpendicular to the annular sidewall. The protective covering further comprises at least one annular recess intermediate at least two annular ridges that reside along an interior surface at the proximal end of the covering. These series of annular ridges and recesses form a removably tight seal around the exterior surface of the sensor that minimizes the migration of corrosive gases and fluids to the exterior surface of the sensor.

30 Claims, 6 Drawing Sheets

ANTENNA COVERING FOR WIRELESS SENSOR

CROSS-REFERENCE

The present application claims priority from U.S. Provisional application Ser. No. 61/657,409, filed Jun. 8, 2012.

TECHNICAL FIELD

The present invention relates to a protective covering for fluid pressure sensors and, more specifically, to a protective covering for wireless fluid pressure sensors.

BACKGROUND OF THE INVENTION

Accuracy, versatility, ease of use, durability, and cost of manufacturing are important parameters for wireless fluid pressure sensors. In the past hermetically sealed sensors have been used to provide a reference atmosphere for the pressure transducer (the pressure transducer providing an output indicative of a pressure differential on two surfaces of the transducer). A hermetic seal requires a container that is rigid and sealed well enough to withstand the normal wear and tear of a component which may be used in relatively instrument unfriendly industrial environments such as in chemical refineries and oil wells.

Such hermetically sealed pressure sensors provide a pressure measurement with respect to the environment inside the sensor package when the sensor was sealed. Therefore, it is critical for the sensor to maintain its hermetic seal to maintain correct operation. Since these sensors are generally placed in harsh environments that typically comprise corrosive gasses and/or liquids, the exterior housing of the sensor may become susceptible to corrosion over time. If the exterior housing were to degrade, in addition to contaminating the media being monitored, the sensor's hermetic seal maybe compromised resulting in a sensor that does not operate correctly.

To protect the sensor from its external environment, the exterior housing is generally composed of a material, such as stainless steel, that is resistant to corrosion. However, such corrosion resistant materials are generally not conducive to wireless transmission in the radio frequency range. In particular, materials such as stainless steel, which are generally resistant to corrosion from environments in which the sensor is typically positioned, do not typically allow for optimal transmission and reception of wireless signals. Therefore, to allow for improved transmission and reception of these wireless sensor signals, the exterior housing of the antenna portion of the sensor is generally composed of a polymeric material such as acrylonitrile butadiene styrene (ABS), whereas, the exterior housing of the remaining sensor body is generally composed of stainless steel. However, these polymeric materials that allow for wireless transmission are typically susceptible to corrosion and, therefore, not ideal for use in corrosive environments such as chemical refineries and oil wells.

What is needed therefore, is a protective covering that protects the fluid pressure sensor from corrosive environments. In addition to its corrosion resistance, the protective covering should also allow for optimal transmission and reception of wireless signals, particularly in the radio frequency range.

SUMMARY OF THE INVENTION

The present invention comprises a protective covering, composed of a corrosion resistant material that protects the sensor from its external environment. In addition, the protective covering also allows for transmission of wireless signals in the radio frequency range, thus enabling proper operation of the wireless pressure sensor. The present invention comprises a protective covering designed to be removably positioned over the antenna portion of a wireless pressure sensor. The protective covering inhibits corrosion of the exterior housing of the sensor while at the same time allowing for transmission of wireless signals, particularly radio frequency (RF) wireless signals through its thickness. More specifically, the corrosion resistant material of the covering allows for transmission of wireless signals, i.e. radio frequency signals, through its thickness without interference or loss of signal strength.

In a preferred embodiment, the protective covering is composed of a corrosion resistant polymeric material. Furthermore, the protective covering is designed such that it provides a tight interference fit over the housing of the sensor such that it inhibits migration of the corrosive fluids from coming into contact with the exterior surface of the sensor.

BRIEF DESCRIPTION OF THE DRAWINGS

FIG. 1 is an exploded view of the pressure sensor shown in FIG. 1.

DESCRIPTION OF THE PREFERRED EMBODIMENTS

Figure 1:
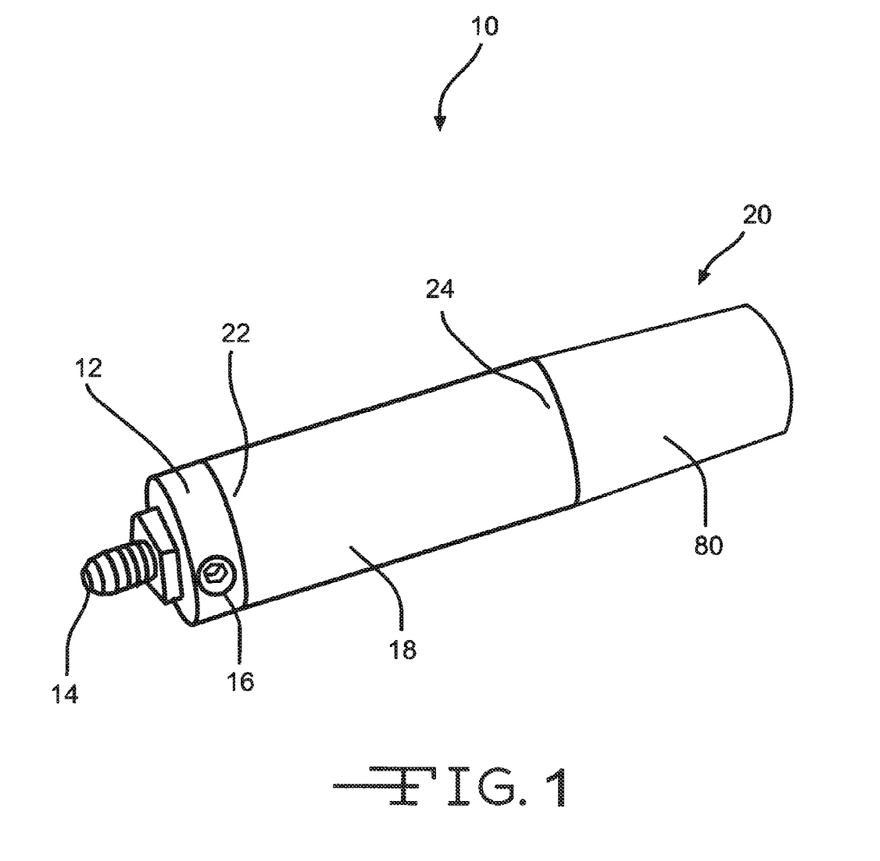
FIG. 1 is a perspective view of an embodiment of a fluid pressure sensor in accordance with the present invention.

Turning now to the drawings, FIG. 1 shows a perspective view of a wireless pressure sensor 10 in accordance with the present invention. As illustrated, the sensor 10 comprises a pressure cap 12 having a pressure port 14 for receiving a fluid, a pressure equalizing or reference port 16 in the pressure cap 12, a sleeve-like sensor housing 18, and an antenna portion 20. Further discussion of the wireless pressure sensor 10 is disclosed in U.S. Pat. Nos. 7,389,695 and 7,832,277, both to Skwara, which are assigned to the assignee of the present application and are herein incorporated by reference.

Figure 2:
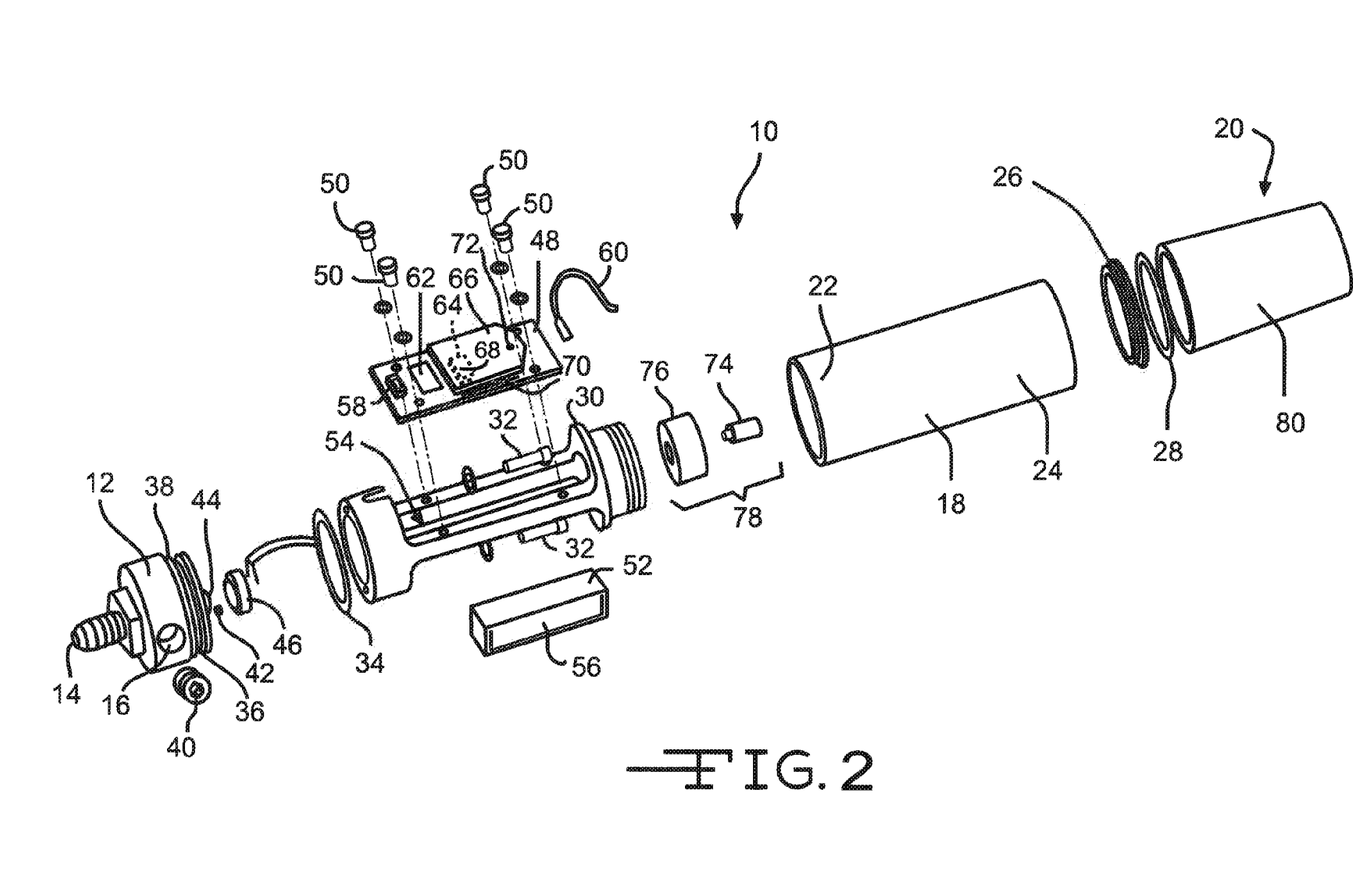

FIG. 2 is an exploded view of the sensor 10 showing various components comprising the sensor 10. As shown, the sensor housing 18 comprises an elongated tubular housing body having a proximal housing end 22 and a distal housing end 24. An end cap 26 is preferably secured to the distal sensor housing end 24. In addition, a first O-ring 28 is positioned between the housing distal end 24 and the antenna portion 20. In a preferred embodiment, the elongated sensor housing 18 is constructed from a corrosion resistant metal.

More specifically, the sensor housing 18 may be composed of stainless steel, MP35N, or a nickel-chromium-cobalt alloy.

In a preferred embodiment, a frame 30 is provided provide a rigid structure to the sensor 10. In addition, the frame 30 provides a structure on which electronic components of the sensor are attached. The frame 30, which is preferably composed of a metal such as aluminum, resides within the sensor housing 18. In a preferred embodiment, the frame 30 is attached to the antenna portion 20 at its distal end and the pressure cap 12 at its proximal end.

As shown, female threads in the proximal end of the antenna portion 20 mate with male threads formed on the frame 30. The frame 30 is preferably fastened to the pressure cap 12 by screws 32. A second O-ring 34 fits into a groove 36 in the pressure cap 12. In addition, the sensor housing 18 fits over the frame 30 and onto a lip 38 in the pressure cap 12. The second O-ring 34 forms an airtight and moisture tight seal between the sensor housing 18 and the pressure cap 12. When the antenna is screwed onto the frame 30, the first O-ring 28 also forms an airtight and moisture tight seal between the antenna portion 20 and the housing 18 such that the interior of the housing 18 is sealed from the outside atmosphere when a reference port screw 40 is screwed into the reference port 16. If desired, a micron filter 42 may be inserted in the passageway between the reference port 16 and the interior of the pressure sensor 10 to prevent dirt and debris from entering.

In an embodiment, the pressure port 14 connects to the other end of the pressure cap 12 at an opening 44. The pressure inlet side of a pressure sensing element 46, such as a model number P571 manufactured by Strain Measurement Devices of Meriden, Conn., may be joined to the opening 44. The opposite side of the pressure sensing element 46 has a sputtered metal strain gauge formed on the pressure sensing element 46 in the form of a Wheatstone bridge thereby providing four electrical contacts to the strain gauge.

As further illustrated in FIG. 2, an electronics board 48 is attached to the frame 30 by four bolts 50. A battery holder 52 is also attached to the back of the electronics board 48 so that it projects through an opening 54 in the frame 30. A battery 56 is preferably mounted in the battery holder 52. In a preferred embodiment, the battery 56 is of a lithium thionyl chloride chemistry. However, other battery chemistries, including, but limited to lithium manganese, can also be used.

The electronics board 48 has four major components, a Zero Insertion Force (ZIF) connector 58 which receives one end of a flexible wire harness 60, a barometric pressure sensor 62 for measuring the absolute pressure inside the pressure sensor 10, a microcontroller 64 for controlling the operation of the pressure sensor 10, and a data modem 66 such as a ZigBee/IEEE 802.15.4 RF data modem. The microcontroller 64 has an internal temperature sensor 68. The RF data modem 66 is mounted onto sockets 70, and the microcontroller 64 is located under the RF data modem 66. The RF data modem 66 preferably comprises either a XBee or a XBe-Pro RF Module modem such as that manufactured by MaxStream of Lindon, Utah. In a preferred embodiment, an RF connector 72 is attached to a coaxial cable that is also connected to the RF data modem 66. The coaxial cable connects the modem 66 to a connecting conductor 74 held in a connecting insulator 76 of an RF feedthrough system 78. The RF feedthrough system 78 preferably provides consistent characteristic impedance required for effective coupling of the RF data modem 66 to the antenna portion 20.

The antenna portion 20 is preferably manufactured by Antennex of Glaendale Heights, Ill. In an embodiment, the antenna portion 20, which comprises an antenna circuit board (not shown), resides within an antenna housing 80. In a preferred embodiment, the antenna housing 80 is composed of a polymeric material that allows RF wireless signals to pass through its thickness without interference or loss of signal strength. More preferably, the antenna housing 80 is composed of acrylonitrile butadiene styrene (ABS).

FIGS. 3, 4, 4A, 5 and 5A illustrate embodiments of the protective covering 82 of the present invention. In a preferred embodiment, the protective covering 82 is removably positioned over the antenna portion 20 of the wireless pressure sensor 10. More specifically, the protective covering 82 is positioned over the antenna housing 80 of the pressure sensor 10 such that at least a portion of the exterior surface of the distal end 24 of the sensor housing 18 is covered, thus, forming a tight, vacuum interference fit around the circumference of the sensor 10. The provision of the vacuum interference fit will be described in greater detail hereinafter.

The protective covering 82 of the present invention is preferably made from a polymeric material. The polymeric material is designed to inhibit degradation of the exterior surface of the sensor's antenna portion 20 and, thus, inhibit possible degradation of the device's hermetic seal caused by exposure to corrosive environments. In addition, the protective covering 82 allows for radio frequency (RF) wireless signals to pass through the material of the covering 82 without interference or loss of signal strength.

Figure 3:
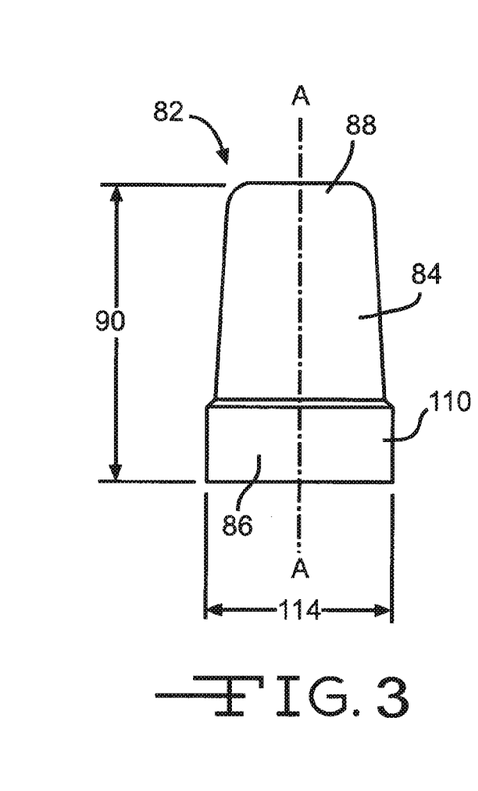
FIG. 3 is a side view of an embodiment of the protective covering of the present invention.
Figure 4:
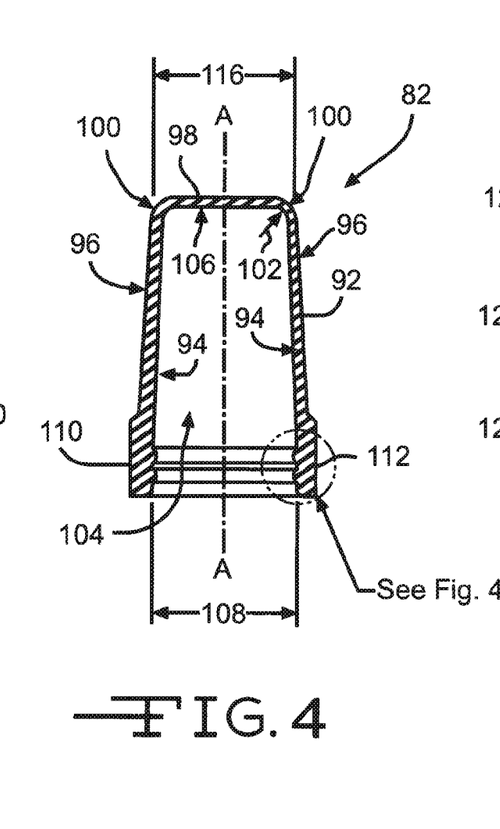
FIG. 4 is a cross-sectional view, taken from the side of the embodiment of the protective covering shown in FIG. 3.

As shown in FIGS. 3 and 4, the protective covering 82 comprises a protective covering body 84 having a proximal end 86 spaced from a distal end 88. A longitudinal axis A-A extends along an elongated length 90 of the body 84 of the covering 82. An annular elongated body sidewall 92, having an interior sidewall surface 94 and an opposing exterior sidewall surface 96, extends between the proximal and distal ends 86, 88 to form the body 84 of the covering 82.

In a preferred embodiment, the annular body sidewall 92 meets a distal end sidewall 98 at the distal end 88 of the covering body 84. As shown, the distal end of the annular sidewall 92 fluidly transitions into the distal sidewall 98 forming a continuous connection therebetween. The distal end sidewall 98 is positioned about perpendicular to the annular body sidewall 92 and longitudinal axis A-A. In a preferred embodiment, the distal end 88 of the covering 82 comprises a beveled surface 100 having a radius of curvature 102 ranging from about 0.05 inches to about 0.2 inches.

As shown in FIG. 4, a cavity 104 resides within the body 84 of the protective covering 82. More specifically, the cavity 104 extends through the proximal end 86 of the covering 82 to an interior surface 106 of the distal end sidewall 98. In a preferred embodiment, the cavity 104 defines an inner protective covering diameter 108 that spans across diametrically opposed interior surfaces 94 of the annular body sidewall 92. In a preferred embodiment, the inner diameter 108 of the protective covering 82 ranges from about 0.5 inches to about 3 inches. The inner diameter 108 of the body 84 of the covering 82 is designed to provide an interference fit over the antenna portion 20 of the pressure sensor 10.

At the proximal end 86 of the protective covering 82 resides a protective covering base portion 110. The base portion 110 comprises an annular base sidewall 112 having an outer base diameter 114. In a preferred embodiment, the outer base diameter 114 is greater than an outer diameter 116 formed by the body sidewall 92. In a preferred embodiment, the outer base diameter 114 ranges from about 1.75 inches to about 2.0 inches whereas the outer diameter 116 of the elongated body 84 ranges from about 1.5 inches to about 1.75 inches.

Figure 4A:
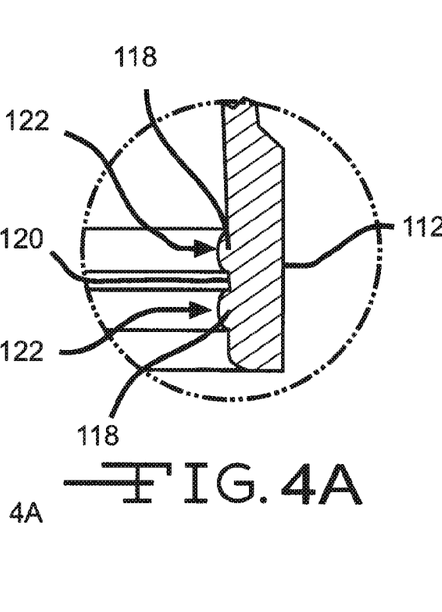
FIG. 4A is a magnified cross-sectional view of a portion of the protective covering shown in FIG. 4.

As shown in FIGS. 4 and 4A, the protective covering 82 comprises at least one interior rib 118 and at least one interior recess 120. The rib 118 and recess 120 reside at the base portion 110 of the protective covering 82. More specifically, the rib 118 and recess 120 are positioned along the annular interior surface 94 of the base portion 110 of the covering 82. In addition, it is preferred that the rib 118 and recess 120 are positioned along the interior surface 94 of the base portion 110 in an alternating fashion such that there is at least one annular recess 120 intermediate two annular ribs 118. The ribs 118 and at least one recess 120 are preferably positioned in a perpendicular orientation to longitudinal axis A-A such that they continuously circumnavigate the longitudinal axis. In addition, it is preferred that each of the ribs 118 protrude from the interior surface 94 of the base portion 110 and extend into the cavity 104. The recess 120 is further recessed, at least partially, into the interior surface 94 of the base portion 110. In a preferred embodiment, each of the rib portions protrude from the interior surface 94 into the cavity 104 by about 0.01 inches to about 0.10 inches. Furthermore, it is preferred that each of the ribs 118 comprise a curved exterior surface 122. The combination of the annular ribs 118 and at least one recess 120 create a gripping surface, which forms an interference fit when positioned over the antenna portion 20 of the sensor 10.

It is believed that this interference fit creates a very slight vacuum in the area of the recess 120 sandwiched between the at least two ribs 118. This vacuum is, in part, a result of the pliable nature of the polymeric material compressing against the covering 82 as it is stretched over the antenna housing 80. In its stretched condition, mounted on the antenna portion 20, the vacuum created by the enlarged area of the recess 120, between the ribs 118, helps seal the covering 82 to the antenna housing 80 of the pressure sensor 10. Moreover, the vacuum created at the enlarged recess 120 bounded by the two ribs 118 is in addition to any vacuum that may be created by an enlargement of the cavity 104 within the body 84 of the covering 82 as it is mounted on the sensor 10.

Figure 5:
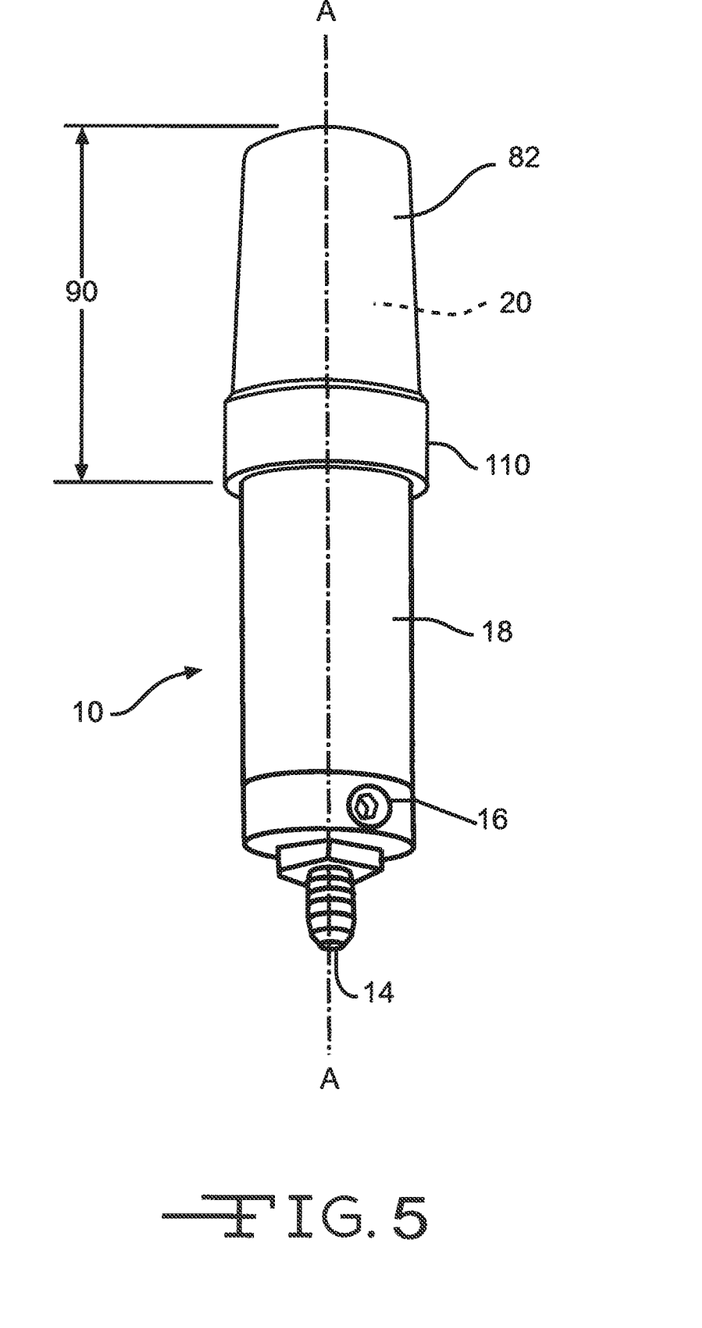
FIG. 5 illustrates an embodiment of the protective covering of the present invention positioned on the distal end of the sensor shown in FIG. 1.
Figure 5A:
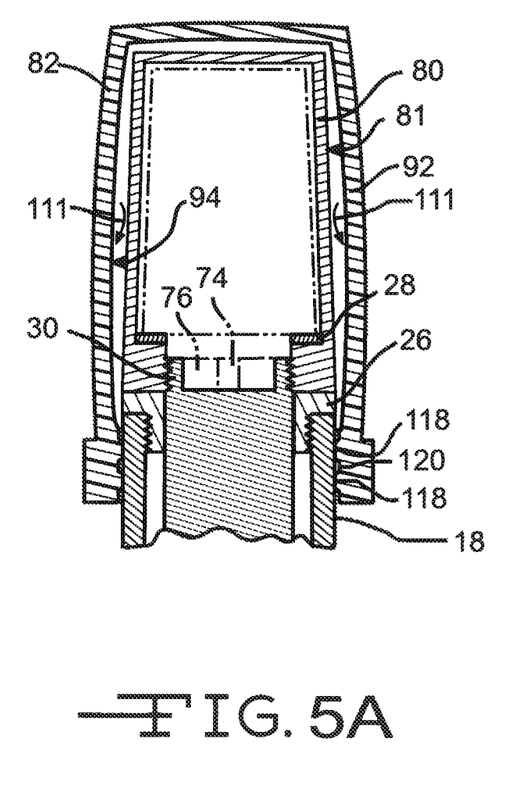
FIG. 5A is a cross-sectional view of the embodiment of the protective covering positioned on the distal end of the sensor shown in FIG. 5.

FIGS. 5 and 5A illustrate an embodiment of the protective covering 82 of the present invention positioned over the antenna portion 20 of the sensor 10. In a preferred embodiment, when positioned on the sensor 10, the proximal end 86 or base portion 110 of the covering 82 extends past the proximal end of the antenna such that a portion of the distal end of the housing 18 of the sensor 10 is covered. This preferred positioning of the covering 82 provides a protective environment for the antenna portion 20 such that exposure of the antenna housing 80 to corrosive gases and liquids is minimized.

The cross-sectional view of FIG. 5A, further illustrates an embodiment of the seal created by positioning the covering 82 over the antenna housing 80 of the pressure sensor 10. As shown in FIG. 5A, the vacuum created by the enlarged area of the recess 120, between the ribs 118, helps seal the covering 82 to the antenna housing 80 of the pressure sensor 10. In a preferred embodiment, as noted by arrows 111 illustrated between interior surface 94 of the covering 82 and an exterior surface 81 of the antenna housing 80, the body sidewall 92 is slightly expanded thereby creating a vacuum between the exterior surface of the antenna 81 and the interior surface 94 of the covering 82. In addition, a vacuum is preferably formed between the respective rib and recess 118, 120 and the exterior surface of the sensor body 18. Furthermore, it is also noted that the exterior surface 81 of the antenna housing 80 may have a roughened surface. This roughened surface also helps provide an interference seal and vacuum fit between the antenna housing 80 and the interior surface 94 of the protective covering 82.

As previously mentioned, it is preferred that the protective covering 82 is composed of a polymeric material. More specifically, the protective covering 82 is composed of a fluoroelastomer material such as Viton® manufactured by E. I. Du Pont De Nemours & Company of Wilmington Del. The preferred fluoroelastomer material is a corrosion resistant material that withstands corrosive environments typically found within oil and natural gas wells. In a preferred embodiment, the polymeric material comprising the protective covering 82 is resistant to corrosion caused by prolonged exposure to natural gas and oil, including crude and refined oil. In addition, it is also preferred that the material comprising the covering 82 is pliable, able to be stretched and expanded.

In addition to being corrosion resistant, the fluoroelastomer material allows for the passage of radio frequencies through its thickness without signal interference or loss of signal strength. In a preferred embodiment, the protective covering 82 allows for the passage of radio frequencies (RF) in the range of about 2.4 GHz to about 2.5 GHz though its thickness. Therefore, the protective covering 82 provides a corrosion resistant barrier that enables the antenna portion 20 of the sensor 10 to send and receive wireless signals.

It is contemplated that the protective covering 82 may be composed of an alternate material that is more suited for the environment in which the sensor is positioned. In other words, the material comprising protective covering 82 may be selected based on its corrosion resistive properties that best match the intended environment. For example, the material selected for use in a corrosive gaseous atmosphere having a pH of about 1-2 may not be ideal for use in a fluid environment having a pH of about 13-14.

In use, the protective covering 82 of the present invention was subjected to a number of performance tests. In these tests, the protective covering 82 of the present invention was positioned over the sensor 10, sealing the antenna portion 20 therewithin. In a first series of tests, the relative strength of the RF wireless signal, emitted from the sensor 10, was tested with and without the protective covering 82 positioned over the antenna portion 20 of the sensor 10.

Figure 6:
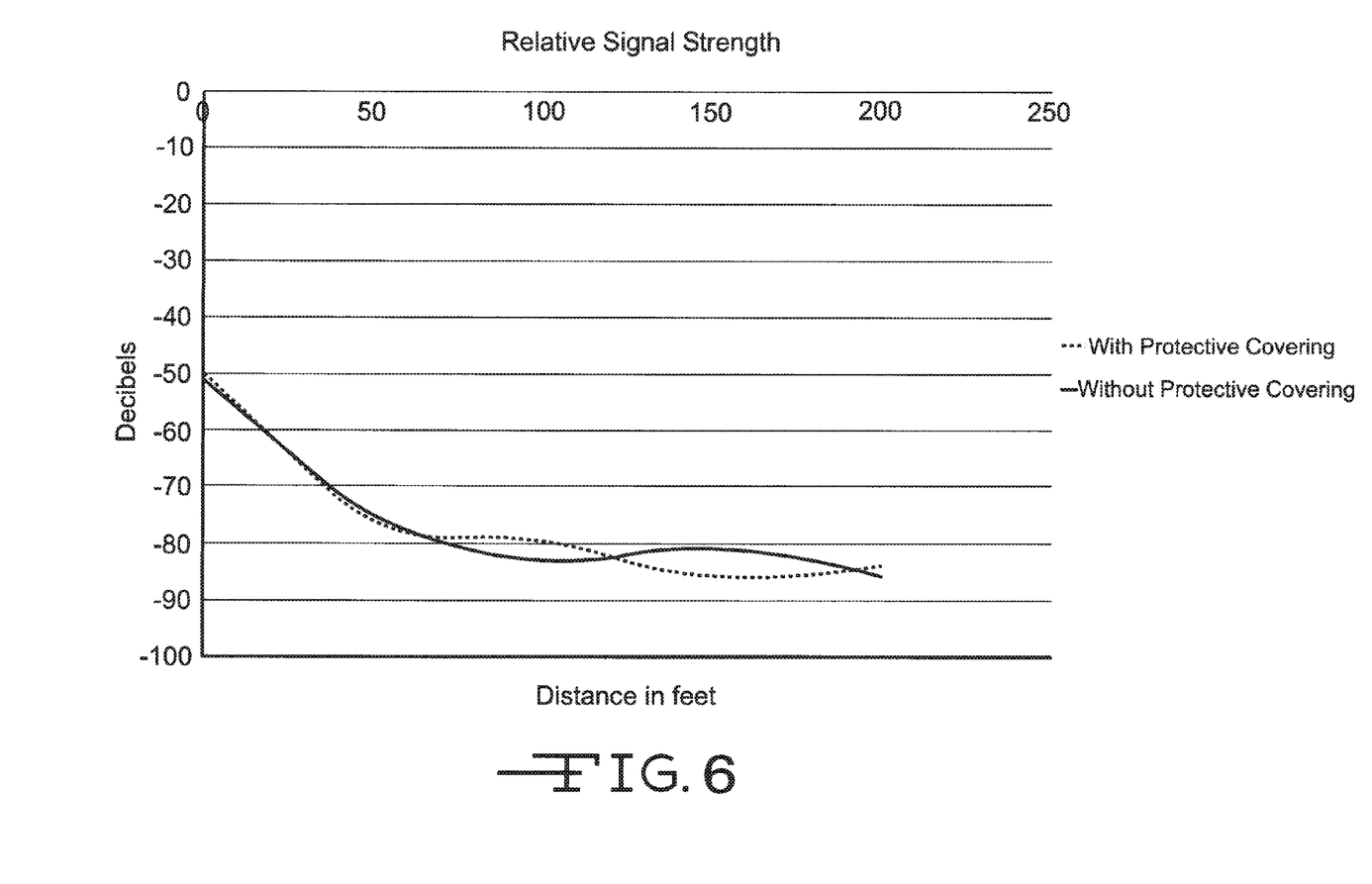
FIG. 6 is a graph illustrating the signal strength as a function of distance emanating from the sensor shown in FIG. 1 with and without the use of the protective covering of the present invention.

FIG. 6 illustrates the results of the signal strength testing that were performed using the pressure sensor 10 with and without the use of the protective covering 82 of the present invention. During the tests, a receiving unit (not shown), designed to receive the RF signal emitted from the sensor 10, was positioned at a distance away from the sensor 10. Various measurements of the relative strength of the RF signal emanating from the sensor were taken. The measurements, measured in decibels (dB), were taken by the receiving unit with and without the protective covering 82 positioned over the sensor 10. After the first set of relative signal strength measurements were taken, the distance between the sensor 10 and the receiving unit was extended and additional signal strength measurements with and without use of the protective covering 82 were taken. Measurements of the relative strength of the transmitted RF signal between the sensor 10 and the receiving unit were taken with and without the protective covering 82 of the present invention, until a separation distance of about 200 feet was achieved. As shown by the graph illustrated in FIG. 6, the relative strength of the RF signal emanating from the sensor 10 was not significantly impaired by the protective covering 82. As the graph shows, variation between the measured signal strengths of the RF signal with and without the protective covering 82 was relatively small. The signal strengths measured with and without the protective covering, as a function distance, were measured to be about the same.

In addition to signal strength testing, a series of immersion tests were performed to assess the integrity of the seal created by the protective covering 82. During the testing, the protective covering 82 of the present invention was positioned over the antenna portion of the sensor 10. A total of six pressure sensors 10 were tested and evaluated. Three of the covered sensors were submerged in Ecocool S741, a mineral oil based lubricant manufactured by the Fuchs Lubricants Company of Stoke-on-Trent UK for about 19 days. The other three covered sensors were submerged in a solution of 10:90 weight percent Ecocool S741 and water solution, also for about 19 days. After being submerged, the sensors were visually inspected and tested. All six submerged sensors were found to be free of cracks and other structural degradation. In addition, all 6 tested sensors were found to be in correct operating order after being submerged for the 19 day period.

Thus, it has been shown that the protective covering 82 of the present invention provides a protective barrier that inhibits corrosion of the exterior surface of the wireless pressure sensor 10. The features of the present invention, such as the annular ribs 118 and recesses 120, in addition to the fluroelastomeric material, provide a protective envelop around the antenna portion 120 of the sensor 10 that mitigates degradation of the sensor as well as permits its intended operation.

What is claimed is:

1. A protective covering for a sensor, the protective covering comprising:
    a) a body having an elongated annular body sidewall extending along a longitudinal axis from a proximal end to a distal end sidewall oriented substantially perpendicular to the longitudinal axis, wherein the elongated annular body sidewall has a thickness with an interior surface defining a cavity; and
    b) a recess extending from the interior surface partway through the thickness of the body sidewall at or adjacent to the body proximal end, wherein the recess at least partially circumnavigates the longitudinal axis.

2. The protective covering of claim 1 wherein the body is composed of a fluoroelastomer or an acrylonitrile butadiene styrene material.

3. The protective covering of claim 1 wherein the recess is intermediate at least two ribs that each protrude into the cavity from the interior surface of the body at or adjacent to the body proximal end, wherein a first rib of the at least two ribs resides closer to the body proximal end and a second rib of the at least two ribs resides closer to the distal end sidewall.

4. The protective covering of claim 3 wherein the at least two ribs are oriented substantially perpendicular to the longitudinal axis.

5. The protective covering of claim 1 wherein the body proximal end comprises a base portion having an outer diameter greater than an outer diameter formed by the elongated annular body sidewall.

6. The protective covering of claim 1 wherein the body is of a material that permits radio frequencies in the range of about 2.4 GHz to about 2.5 GHz to be transmitted through the thickness of the body sidewall.

7. The protective covering of claim 1 wherein the covering body is composed of a polymeric material.

8. The protective covering of claim 1 wherein the recess is oriented perpendicular to the longitudinal axis.

9. A pressure sensor, comprising:
    a) a housing defining a sealed chamber;
    b) a microcontroller positioned in the housing;
    c) a pressure sensing element positioned in the housing, wherein the pressure sensing element is electrically connected to the microcontroller;
    d) a closable passage communicating between air residing outside the housing and a reference atmosphere residing inside the housing;
    e) a barometric pressure sensor positioned in the housing and electrically connected to the microcontroller, wherein the barometric pressure sensor is configured to detect a barometric pressure of the reference atmosphere;
    f) a protective covering positionable over the housing, the protective covering comprising:
        i) a body having an elongated annular body sidewall extending along a longitudinal axis from a proximal end to a distal end sidewall oriented substantially perpendicular to the longitudinal axis, wherein the elongated annular body sidewall has a thickness with an interior surface defining a cavity; and
        ii) at least one recess or at least one rib residing within the interior body sidewall surface at or adjacent to the body proximal end, wherein if a rib, then the at least one rib protrudes into the cavity from the interior surface of the body, and if a recess, then the recess extends partway into a thickness of the annular body sidewall, and wherein the at least one of the recess and the rib at least partially circumnavigate the longitudinal axis.

10. The pressure sensor of claim 9 wherein the housing is of a material that permits transmission of radio frequencies ranging from about 2.4 GHz to about 2.5 GHz through a thickness of the housing.

11. The pressure sensor of claim 9 wherein the body of the protective covering is composed of acrylonitrile butadiene styrene or a fluoroelastomer material.

12. The pressure sensor of claim 9 wherein the at least one recess is intermediate at least two ribs that each protrude into the cavity from the interior surface of the body at or adjacent to the proximal body end, wherein a first rib of the at least two ribs resides closer to the body proximal end and a second rib of the at least two ribs resides closer to the distal end sidewall.

13. The pressure sensor of claim 12 wherein the at least two ribs are oriented substantially perpendicular to the longitudinal axis.

14. The pressure sensor of claim 9 further comprising a modem to provide data transmission, wherein the modem resides within the housing and is electrically connected to the microcontroller.

15. The pressure sensor of claim 14 wherein the modem is a radio frequency (RF) modem.

16. The pressure sensor of claim 14 wherein the modem is capable of communicating via ZigBee or IEEE 802.14.4 transfer protocols.

17. The pressure sensor of claim 9 wherein the housing is composed of a metal selected from the group consisting of stainless steel, MP35N, a nickel-chromium-cobalt alloy, and combinations thereof.

18. The pressure sensor of claim 9 further comprising a zero insertion force connector positioned within the housing and electrically connected to the microcontroller.

19. The pressure sensor of claim 9 further comprising an antenna residing within the housing and electrically connected to the microcontroller.

20. The pressure sensor of claim 19 wherein the antenna comprises an antenna circuit that resides within the housing and electrically connected to the antenna.

21. The pressure sensor of claim 9 wherein the body of the protective covering is composed of a polymeric material.

22. The pressure sensor of claim 9 wherein the at least one recess or the at least one rib is oriented perpendicular to the longitudinal axis.

23. The pressure sensor of claim 9 wherein the protective covering further comprises at least one rib and at least one recess that reside within the interior body sidewall surface at or adjacent to the body proximal end.

24. A pressure sensor, comprising:
  a) a housing comprising a housing sidewall defining a sealed chamber;
  b) a microcontroller positioned in the housing;
  c) a pressure sensing element positioned within the housing, wherein the pressure sensing element is electrically connected to the microcontroller;
  d) a closeable fluid passage communicating from outside the housing to an interior of the housing;
  e) a modem that resides inside the housing and electrically connected to the microcontroller, wherein the modem is configured to provide wireless data transmission;
  f) an antenna residing within the housing and electrically connected to the microcontroller;
  g) a barometric pressure sensor residing in the housing and electrically connected to the microcontroller, wherein the barometric pressure sensor is configured to detect a barometric pressure of the reference atmosphere residing inside the sealed chamber; and
  h) a protective covering positionable over the housing, the protective covering comprising:
    A) a body composed of a polymeric material having an elongated annular body sidewall extending along a longitudinal axis from a proximal end to a distal end sidewall oriented substantially perpendicular to the longitudinal axis, wherein the elongated annular body sidewall has a thickness with an interior surface defining a cavity; and
    B) at least one recess or at least one rib residing within the interior body sidewall surface at or adjacent to the body proximal end, wherein if a rib, then the at least one rib protrudes into the cavity from the interior surface of the body, and if a recess, then the recess extends partway into a thickness of the annular body sidewall, and wherein the at least one of the recess and the rib at least partially circumnavigate the longitudinal axis.

25. The pressure sensor of claim 24 wherein the polymeric material comprising the protective covering is composed of a fluoroelastomer or an acrylonitrile butadiene styrene material.

26. The pressure sensor of claim 24 wherein the at least one recess or the at least one rib is oriented perpendicular to the longitudinal axis.

27. A protective covering for a sensor, the protective covering comprising:
  a) a body having an elongated annular body sidewall extending along a longitudinal axis from a proximal end to a distal end sidewall oriented substantially perpendicular to the longitudinal axis, wherein the elongated annular body sidewall has a thickness with an interior surface defining a cavity; and
  b) wherein at least one rib resides within the interior body sidewall surface at or adjacent to the body proximal end, wherein the rib protrudes into the cavity from the interior surface of the body, and wherein the at least one rib at least partially circumnavigates the longitudinal axis.

28. The protective covering of claim 27 wherein the body is composed of a polymeric material.

29. The protective covering of claim 27 wherein the body is of a material that permits radio frequencies in the range of about 2.4 GHz to about 2.5 GHz to be transmitted through a thickness of the body sidewall.

30. The protective covering of claim 27 wherein the at least one rib is oriented perpendicular to the longitudinal axis.

\* \* \* \* \*